March 25, 1941.  E. H. MUELLER  2,236,109
VALVE AND STEM
Filed June 29, 1939
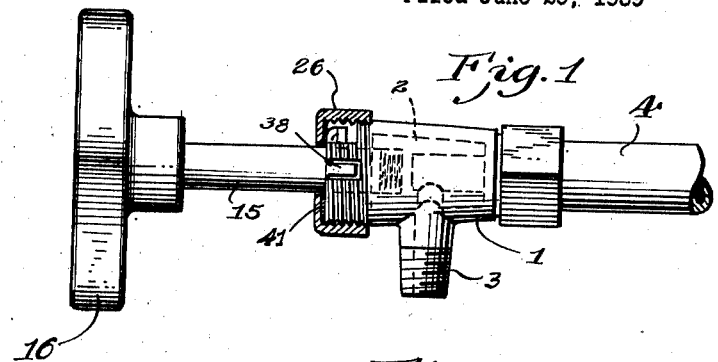
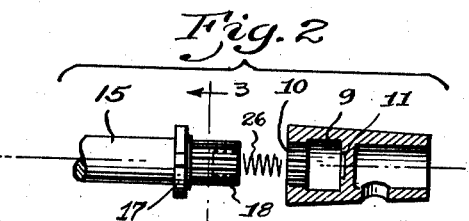
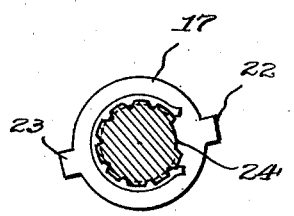
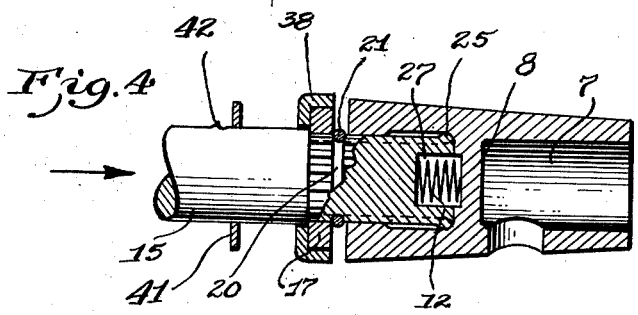
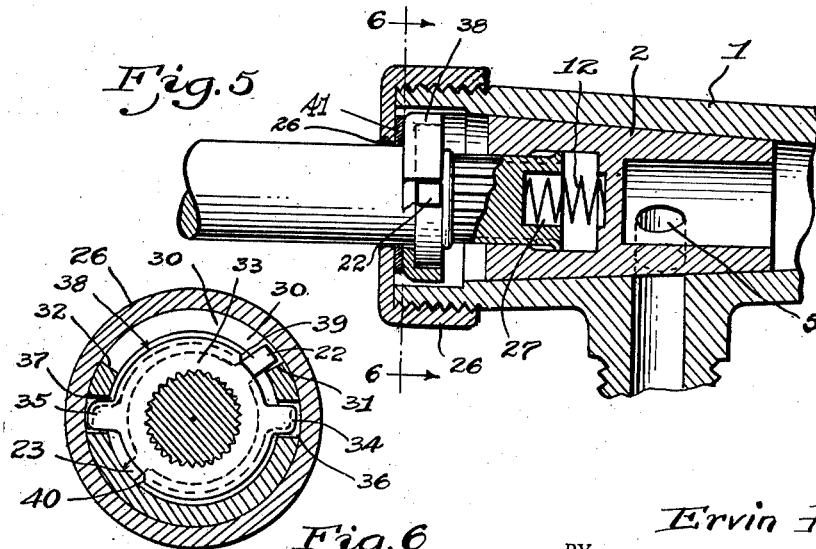
INVENTOR.
Ervin H. Mueller
BY
Barnes, Kisselle, Laughlin & Raisch
ATTORNEYS Patented Mar. 25, 1941

2,236,109

UNITED STATES PATENT OFFICE 2,236,109

VALVE AND STEM

Ervin H. Mueller, Grosse Pointe, Mich.

Application June 29, 1939, Serial No. 281,909

4 Claims. (Cl. 251—165)

This invention relates to a valve structure which is particularly useful as a gas cock wherein the valve is of the locking type and cannot be opened by a turning action until some other movement is given to the valve.

Such a valve may have a rotary valve member disposed within a valve body together with a stem and handle for rotating the valve member. The stem, however, is slidably but non-rotatably fixed to the valve member and must be shifted axially, or at least shifted relative to the valve body, in order to disengage a locking device, which normally prevents rotation of the valve. This invention is directed to structure of this kind wherein certain of the parts are permanently united in a sub-assembly. In accordance with the invention these devices thus permanently assembled may include the valve member itself, its stem, one or more springs which may serve a double purpose, as will later appear, and a locking member. Thus when the valve is disassembled these parts in the sub-assembly will not come apart, and the small pieces will be held permanently in the sub-assembly so as not to be lost or misplaced. The arrangement also facilitates assembly of the valve structure and disassembly thereof.

The invention is exemplified in the accompanying drawing wherein:

Fig. 1 is a general view of the valve constructed in accordance with the invention with some parts cut away and some parts shown in section.

Fig. 2 is a bracketed view of some of the parts prior to being placed in the permanent sub-assembly.

Fig. 3 is an enlarged cross sectional view taken substantially on line 3—3 of Fig. 2.

Fig. 4 is an enlarged cross sectional view showing the manner of establishing the parts in sub-assembly.

Fig. 5 is an enlarged cross sectional view taken through the valve showing the relation of the parts upon assembly of the valve structure.

Fig. 6 is a view taken substantially on line 6—6 of Fig. 5 showing certain details of the structure.

The valve itself may take various forms and, as shown herein, the valve has a body 1 with the valve chamber therein in which is rotatably situated a plug valve member 2. The valve body has an inlet 3 and an outlet which may connect to an outlet conduit or the like 4. The plug valve has a port 5 arranged to be brought into and out of registry with the inlet passageway 6.

As illustrated, the port 5 leads into a bore 7 in the valve member which is closed by a wall 8 from a recess or bore 9. The recess 9 has its outer wall portion arranged for a non-rotatable and slidable connection with the stem, and to this end the outer portions of the walls are serrated as shown at 10. The wall 7 may have a recess 11 which constitutes a seat for a coil spring 12.

A stem is shown at 15 arranged to receive a handle 16, and it is provided with a locking washer 17. This washer may be fitted over the splines 18 on one end of the stem and the stem may be grooved as at 20 for the reception of a U spring locking member 21 to hold the washer in position. The locking washer 17 has extending arms 22 and 23, one of which is longer than the other for purposes which will presently appear. The serrated or splined formations at 10 and 18 are preferably non-uniform or uninterrupted so that portion 18 of the stem can be slidably and non-rotatably engaged with the valve member only in one relative position of these two members. To this end one of the ribs of the splines may be omitted as indicated at 24. Also, the washer 17 can be placed on the stem only in one relative position.

These parts are assembled as shown in Fig. 4. The splined end of the stem is slidably fitted with the splines in the valve member. However, a coil spring 26 is interpositioned between the two, for which purpose the stem has an axial recess 27 for receiving the stem. The two members are brought together with pressure, as for example, by hitting the stem with a hammer while the plug is supported, and this causes the metal at the extreme end of the stem to be flared outwardly, as shown at 25. These parts are now permanently assembled and cannot come apart in normal use, because the flared portions 25 will not pass through the splines 10.

This sub-assembly is then located within the valve body with the valve member seating in the chamber and the cap 26 may then be applied. Means is provided for cooperation with the extensions 22 and 23 to lock the valve member against rotation, but the members 22 and 23 may be shifted out of locking position by axial shift of the stem relative to the plug valve member. To this end the end of the valve body may be cut away as at 30 leaving abutments 31 and 32. A locking washer 33 has extensions 34, 35 disposed in the keyways 36 and 37 fashioned in the extending end of the valve body. This locking washer has a depending flange 38 which lies within the body, but the flange is cut away to form abutments as at 39 and 40. The locking washer may be permanently attached to the stem. To this end a small washer 41 having a close fit with the stem may be used to abut the locking washer, and the metal of the stem may be thrown up or peened over as at 42 to hold the washer 41 from sliding off the stem. The washer 41 fits in between the locking washer and the cap.

The spring 12 exerts an expanding force and normally urges the plug valve on its seat and urges the stem in the opposite direction. The relatively long projection 22 functions between the stops 31 and 32. As shown, the valve is "off" when the extension 22 abuts the shoulder 31, and is "on" when it abuts the shoulder 32. It will be noted that locking notches are provided for the extension. When the valve is "off" the washer 17 is backed up against the locking washer 33 and the projection 22 is in a locking recess constituted by the abutment 31 and the abutment 39. The extension 23 is likewise positioned in locking relation to the abutment or shoulder 40. In this condition the parts take the position substantially as shown in Fig. 5. Thus it will be seen that when the valve is in assembly the spring 12 cannot force the stem outwardly of the recess and the valve member far enough to put any pressure upon the flared parts 25. To rotate the valve the stem is pushed inwardly. This partially collapses the spring 12 and shifts the projections 22 and 23 inwardly and out of locking notches, whereupon the stem and valve may be rotated to "on" position, at which time the projection 22 strikes the shoulder 32. After initial turning movement has been given to the stem and valve, and the axial pressure removed, the fingers 22 and 23 ride on the surfaces of the flanges 38 under the action of the spring 12. When the valve is turned back to "off" position, the spring 12 snaps the stem and washer axially, moving the fingers 22 and 23 into the locking notches.

Any time the valve has to be taken apart, it is but necessary to remove the cap 26 and then the entire sub-assembly comprising the stem, valve member, spring and washer 17, can be taken out. The locking washer 33 will also be held in this sub-assembly. Thus there is no chance to lose such small parts as are in this sub-assembly, as might be the case where the spring or some small parts are caused to fly into remote places by the action of the spring. At this time the spring 12 expands and the flared portions 25 abut up against the splines 10. It is within the invention to form the stem and valve member with a non-rotatable and slidable connection fashioned other than by splines, as any polygonal or non-rotatable shape will suffice.

I claim:

1. In a valve structure, a valve body, a rotatable valve member, an operating stem, a locking member on the stem, cooperating locking means on the body, the locking member and cooperating means holding the stem against rotation when in engagement, and the locking member being arranged to be disengaged from the locking means by axial movement of the stem, a recess in the valve member having serrated walls adjacent its open end and enlarged inwardly of the serrated walls, one end of the stem being serrated and slidably fitting the serrations of the recess, a spring in the recess functioning between the stem and the valve member, and an enlargement on the end of the stem in the recess functioning in the enlarged portion of the recess for holding the stem and valve in assembly against the action of the spring.

2. A sub-assembly for a valve comprising, a valve member with a recess in one end, an operating stem having one end in the recess, a spring compressed between the stem and valve member and normally acting to slidably separate the stem and valve member, the end of the stem being serrated, the walls of the recess adjacent its open end having corresponding serrations for non-rotatably and slidably connecting the valve member and stem, the serrations in the deeper portion of the recess being removed whereby, in effect, the deeper portions of the recess are enlarged, the end of the stem having an enlarged formation slidably functioning in the enlarged portion of the recess to hold the stem, valve member and spring in sub-assembly.

3. A sub-assembly for a valve comprising, a valve member with a recess in one end, an operating stem having one end in the recess, a spring compressed between the stem and valve member and normally acting to slidably separate the stem and valve member, the end of the stem being serrated, the walls of the recess adjacent its open end having corresponding serrations for non-rotatably and slidably connecting the valve member and stem, the serrations in the deeper portion of the recess being removed whereby, in effect, the deeper portions of the recess are enlarged, the end of the stem having an enlarged formation slidably functioning in the enlarged portion of the recess to hold the stem, valve member and spring in sub-assembly, a locking washer non-rotatably secured to the stem on said serrations and a spring positioning member for holding the locking member axially fixed on the stem.

4. A sub-assembly for a valve comprising, a valve member having a recess, an operating stem having one end slidably and non-rotatably located in the recess, a spring in the recess acting between the valve member and stem, cooperating means on the stem and valve member for holding the stem and valve member assembled with each other, with the spring confined therebetween, a locking member non-rotatably secured to the stem independently of the valve member in a permanent manner, a locking washer slidably and rotatably mounted on the stem adjacent the locking member and adapted to be non-rotatably engaged with a valve body, and a projection of thrown-up metal on the stem and on the side of the locking washer opposite the locking member for holding the locking washer on the stem in a permanent manner.

ERVIN H. MUELLER.